United States Patent
Kloefkorn

[11] 3,845,841
[45] Nov. 5, 1974

[54] AUXILIARY FUEL FEEDING SYSTEM FOR A VEHICLE

[76] Inventor: Earl W. Kloefkorn, Manchester, Okla. 73758

[22] Filed: Dec. 16, 1969

[21] Appl. No.: 885,465

[52] U.S. Cl.............. 180/54 R, 123/136, 137/209, 137/565, 137/588, 220/44 R
[51] Int. Cl........................................... B60k 15/02
[58] Field of Search.............. 180/1, 54 R; 280/5 A; 123/136; 220/44 R; 137/588, 572, 565, 209, 201

[56] References Cited
UNITED STATES PATENTS

| | | | |
|---|---|---|---|
| 1,088,854 | 3/1914 | Wadsworth | 123/136 X |
| 2,151,043 | 3/1939 | Paton | 137/13 |
| 2,561,238 | 7/1951 | Smit | 137/209 X |
| 2,582,209 | 1/1952 | Smith et al | 220/44 |
| 2,679,946 | 6/1954 | Friend | 220/44 X |
| 2,894,736 | 7/1959 | Wentworth | 123/136 UX |
| 2,997,102 | 8/1961 | Stearns | 137/588 X |

Primary Examiner—David Schonberg
Assistant Examiner—Milton L. Smith
Attorney, Agent, or Firm—Ronald W. Mayes

[57] ABSTRACT

A novel auxiliary fuel feeding system for a vehicle wherein the spare tire and wheel assembly is used as an accumulator, supply tank, and/or reservoir for a pneumatic pressure fluid, such as air, to supply liquid fuel from a tank to an engine, preferably in a wheeled vehicle; and/or provides novel emergency means for feeding liquid fuel from a tank to an engine upon failure of a conventional fuel pump, or along with the fuel pump.

14 Claims, 4 Drawing Figures

INVENTOR.
EARL W. KLOEFKORN

AUXILIARY FUEL FEEDING SYSTEM FOR A VEHICLE

BACKGROUND OF THE INVENTION

This invention relates to fuel feeding systems. More particularly, this invention relates to fuel feeding systems for engines useful for propelling wheeled vehicles.

Heretofore, wheeled vehicles such as automobiles have depended upon conventional fuel pumps for drawing fuel such as gasoline to gasoline burning internal combustion engines. At the same time, the fuel tank of the automobile was vented to the atmosphere usually via the gas cap to permit atmospheric air to flow into the tank and occupy the space occupied by the gasoline being pumped from the tank and consumed by the engine.

A disadvantage of the fuel pump feeding system was that when the fuel pump failed, there was no auxiliary system for feeding fuel from the tank to the engine. Accordingly, the vehicle was stalled and perhaps stranded until the faulty fuel pump was repaired or replaced.

Moreover, a disadvantage of the vented gasoline tank was that vaporized gasoline added to the air pollution problem. Also the vaporized gasoline represented the richest portion of the gasoline, and this portion was being lost to the atmosphere.

This invention overcomes and solves the problem of a vehicle becoming stalled and/or stranded as a result of a fuel pump failure. The auxiliary fuel feeding system may be connected, if it is not already connected, and put into use in an emergency situation. The use of the spare tire and wheel assembly of the vehicle as an air storage tank eliminates the problem of finding a place to mount the air storage tank of the system on the vehicle. This is because most wheeled vehicles, such as passenger cars, etc., carry at least one spare tire and wheel assembly usually in the trunk. Whether the spare tire and wheel assembly is in the trunk or elsewhere, it is readily available for use as a pressure fluid accumulator or air storage tank in the fluid pressure system.

The novel auxiliary fuel feeding system of this invention not only eliminates the venting of the fuel vapors to the atmosphere when connected as taught herein, but ducts the vapors into the engine for fueling the same. This invention through the use of a pneumatic pressure fluid, such as air, forces the liquid fuel from the tank into the engine and thus eliminates the usual fuel pump and vapor lock problems that may attach to the same.

SUMMARY OF THE INVENTION

One of the objects of this invention is the provision of a novel fuel feeding system preferably for wheeled vehicles.

Another object of this invention is the provision of a novel fuel feeding system that can be used continuously or alternatively put into use only in emergency situations, and/or used with a regular fuel pump located in a fuel feed line from a fuel tank to the engine.

Another object of this invention is the provision of a novel fuel feeding system for supplying liquid fuel to an engine and which also ducts fuel vapors to the engine and prevents the escape of vapors from the fuel tank into the atmosphere and polluting the same.

Yet another object of this invention is the provision of a novel fuel feeding system wherein compressed pneumatic fluid forces liquid fuel from a fuel tank into the fuel injector system of the engine, such as the carburetor or fuel injectors, and any vapors of the fuel are ducted into the air intake system of the engine, such as the air cleaner, air intake, and/or intake manifold.

A further object of this invention is the provision of a fuel feeding system as set forth in the preceding objects wherein compressed pneumatic fluid is supplied by an air compressor driven by the engine or by electrical means, spare tire and wheel and assembly means functioning as a fluid pressure accumulator, and/or emergency cylinder means that may be substituted for the spare tire and wheel assembly means by simply disconnecting the latter and connecting the former in its place.

Another object of this invention is the provision of novel means for venting a fuel tank for a vaporizable liquid back to an engine for consumption and preventing the tank from being vented to the atmosphere.

A further object of this invention is the provision of a novel means for venting a liquid fuel tank as set forth in the preceding object wherein the tank is vented through a filler cap having vacuum means and/or pressure valve means for controlling the ingestion and outflow of vapors and/or pressure fluid, respectively.

A still further object of this invention is an auxiliary fuel feeding system comprising a novel gas cap that permits the pressure fluid referred to in the preceding objects to be fed into the liquid fuel tank therethrough and at the same time comprises vacuum valve means for venting the liquid fuel tank to relieve any vacuum therein, and pressure valve means for venting the liquid fuel tank to relieve excess internal pressure therein, either to the atmosphere and/or to the air intake system of the engine.

In summary, this invention comprises a novel fuel feeding system for engines mounted on wheeled vehicles. The fuel feeding system comprises an air compressor preferably driven by an engine and connected to a liquid fuel tank for forcing fuel therefrom to the engine. The air compressor is also connected to spare tire and wheel assembly means for use of the same as an accumulator, which stores excess compressed air that can be used when the air compressor is not in operation.

In the event that both the air compressor and the accumulator are not supplying compressed air to the liquid fuel tank, an emergency cylinder of an aerosol, propane, or the like, may be connected into the system by first disconnecting the spare tire and wheel assembly and connecting the emergency cylinder in its place.

In the event that the accumulator is to be disconnected from the system altogether, a quick-disconnect coupling is provided for this purpose. The quick-disconnect coupling may then be used for the use of an air chuck, or other pneumatic apparatus or device with the system where compressed air is desired to be used either for inflation purposes or for powering of tools, apparatuses, and the like.

A pressure regulator is provided to regulate the flow of the pressure fluid to the liquid fuel tank. It is also preferred that a shut-off valve be provided to provide a positive means of isolating the pressure fluid from the liquid fuel tank.

Another feature of this invention is the provision of a pressure-vacuum gas cap for the liquid fuel tank that may or may not be vented to the atmosphere as desired at the fuel tank. The air pollution problem may be reduced and the mileage on a gallon of gasoline may be increased where the gas cap is vented back to the engine air intake system as described herein.

The gas cap is provided with a vacuum valve for relieving any vacuum created in the liquid fuel tank by infiltrating the tank with vapors and/or air inducted from the engines air intake system. On the other hand, the gas cap is provided with a pressure fluid responsive valve to relieve excess pressure and vapors in the fuel tank and feeds the same to the engine for consumption by the engine.

The invention further resides in certain novel features of construction, combinations, and arrangements of parts and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which.

Figure 1:
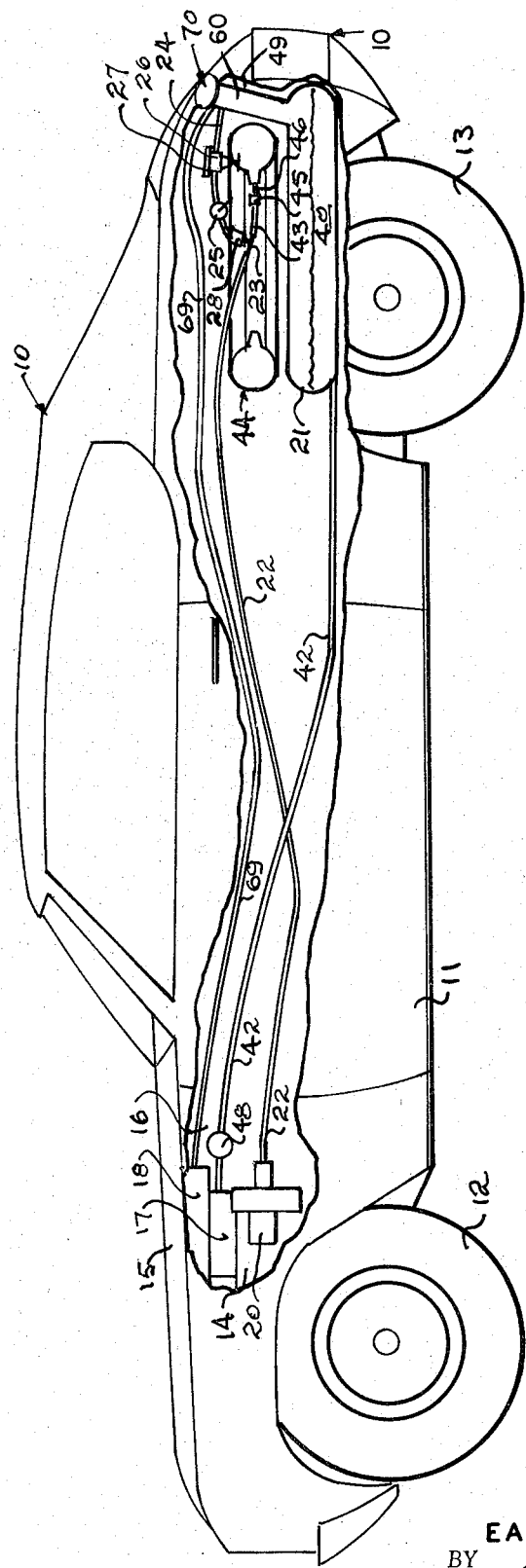
FIG. 1 is a side elevational view of a wheeled vehicle embodying the invention, but with parts broken away and in section to show details of the invention.

It is to be understood that the invention is not limited to the details of construction and arrangements of parts shown in the drawings and hereinafter described in detail, but is capable of being otherwise embodied and of being practiced and carried out in various ways. It is to be further understood that the terminology employed herein is for the purpose of description and there is no intention to limit the invention beyond the requirements of the prior art.

Referring to FIG. 1, the reference numeral 10 indicates generally a wheeled vehicle embodying the invention. The vehicle 10, more particularly, is an automobile. The vehicle 10 comprises a body 11, mounted on front wheel means 12 and rear wheel means 13. The front wheel means 12 are manually controlled by a conventional steering mechanism, not shown. The vehicle 10 has an engine 14 under a hood 15 in a compartment 16. The engine 14 is preferably a gasoline fueled internal combustion engine. The engine 14 drives the rear wheel means 13 by a conventional drive mechanism, not shown.

The engine 14 has a carburetor and intake manifold means 17. An air cleaner 18 is mounted atop of the carburetor and intake manifold means 17 in a conventional manner. The engine 14 drives a conventional air compressor 20 located under the hood 15. However, it will be understood that the air compressor 20 can be driven by other means, such as an electric motor powered either from generator means, or battery means, and can be located in any desired or suitable part of the vehicle 10.

The air compressor 20 supplies compressed air to a liquid fuel tank 21 via a discharge line 22, a T-connection fitting 23, and a removable portable fluid pressure line 24. The air supply line 24 has a manually operated shut-off valve 25, a manually operated pressure control or regulator valve 26 with a pressure indicator gauge 27, and a quick-coupling device 28. By disconnecting the supply line 24 from the discharge line 22 at the quick-coupling device 28, the device 28 is available to have other devices and/or apparatuses connected thereto, such as a chucks, air powered tools, spray guns, etc.

The compressed air in the fuel tank 21 forces liquid fuel, such as gasoline, indicated by the reference numeral 40, into a fuel feed line 42, having a conventional fuel pump 48 therein. It will be understood that the fuel pump 48 can be motored by the fuel driven by the compressed air, and that the fuel pump 48 need not be disabled or removed, in the usual circumstance, before this novel auxiliary fuel feeding system can be put into operation.

The air compressor 20 also supplies compressed air via the discharge line 22, the T-connection fitting 23, and a conduit 43 to a spare tire and wheel assembly indicated generally by the reference numeral 44. Preferably, the conduit 43 terminates in an internally threaded screw cap 45 that is threaded onto a conventional valve stem 46, FIGS. 1 and 2. The cap 45 operates to open any valve in the valve stem 46 in a conventional manner. The spare tire and wheel assembly means 44 function as an accumulator, supply tank, and/or reservoir, and is located in its usual place in the vehicle 10. In this instance the spare tire and wheel assembly means 44 are located in a trunk compartment 49 of the vehicle 10.

While the spare tire and wheel assembly means 44 provided a supply of pressure fluid during start-up of the vehicle 10, the air compressor 20 provides the normal supply of pressure fluid to the fuel tank 21 while the engine 14 of the vehicle 10 is in operation. In the event of a lack of a fluid pressure supply in the spare tire and wheel assembly means 44 or in the event that the spare tire and wheel assembly means 44 are needed elsewhere, an emergency cylinder, not shown, of an aerosol, propane, or other pressure fluid that preferably supports combustion, may be substituted in place of the spare tire and wheel assembly means 44.

The air or other pneumatic fluid entering the liquid fuel tank 21 by the line 24 exerts pressure on the fuel 40, as controlled by the pressure regulator 26, and forces the fuel 40 to the carburetor and intake manifold means 17. In the event that a carburetor system is not in use on the engine, the fuel 40 would be fed to a fuel injector system instead.

A filler neck or spout 60 is preferably equipped with a filler cap, indicated generally by the reference numeral 70. The filler cap 70 is preferably a pressure-vacuum cap provided with a fuel vapor vent system that pipes the vapor back to the air intake and/or cleaner means 18 of the engine 14 via a conduit 69 so that excess vapor is pulled through the combustion chambers of the engine 14. Alternatively, the vented vapors may be piped back and inducted into the carburetor and intake manifold means 17 of the engine 14, along with the charge of atmospheric air to be carbureted by the liquid fuel in the carburetor. A further alternative is that the cap means 70 may be vented directly to the atmosphere if it is not desired to go to the trouble of connecting the vent to the carburetor and intake manifold means 17 referred to hereinabove.

Figure 3:
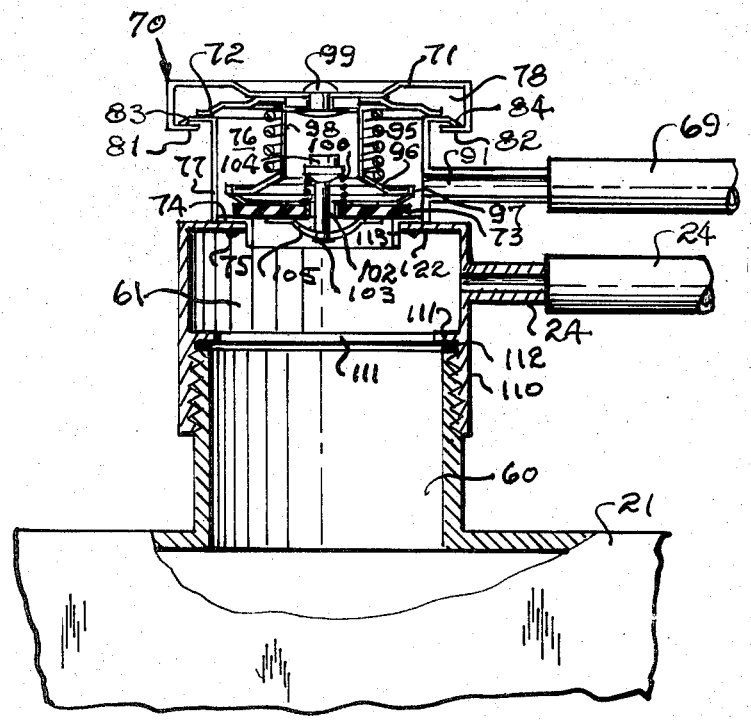
FIG. 3 is an enlarged cross-sectional view and with parts broken away of a novel gas cap of this invention in operational connection with a liquid fuel tank.

The operation of the filler cap means 70 is such that the engine 14 cannot operate on vapors alone from the fuel tank 21 once the shut-off valve 25 has been closed when the auxiliary fuel feeding system is connected for operation. The filler cap means 70 will now be described. Referring to FIG. 3, the filler cap means 70 comprises an inverted cup 71 having a flexible, dishable pressure release valve disc 72 and a rubber or elastomeric pressure release valve disc 73. When a positive pressure is built up in the fuel tank 21, the flexible rubber disc 73 is flexed, dished or urged upwardly off of an horizontal annular seat or flange 74. The flange 74 is fixed to an upper shoulder or surface of a gas filler spout adaptor 61, such as by spot welds or rivets at 75. The filler spout 60 forms a part of the fuel tank 21. The adaptor 61 is necessary since not all gas tank filler spouts, such as the spout 60, are alike. Vapor then flows into a cylindrical or tubular chamber 76, which is formed by a cylindrical wall 77 integrally connected to the flange 74. The vapor, when sufficient pressure is built up in the chamber 76, will cause the pressure seal 72 to flex and dish upwardly and release vapor into a cylindrical chamber 78 of the cap portion 71 and to the atmosphere. It will be noted that this only occurs if the fluid pressure in the chamber 76 cannot be adequately relieved through the tube or conduit 69.

The cap portion 71 has two diametrically opposed and radially inwardly extending planar cam engaging ears 81 and 82 adapted to cam under and tightly engage an annular flange 83 having camming ramps 84 and 85, respectively, of the filler adaptor 61. The flange 83 of the filler spout adaptor 61 is provided with two diametrically opposed bayonet slots, not shown, to accommodate the introduction of the cam engaging ears 81 and 82 beneath the flange 83. The cap portion 71 is tightened by manually turning the same in a clockwise direction, FIG. 3.

Figure 2:
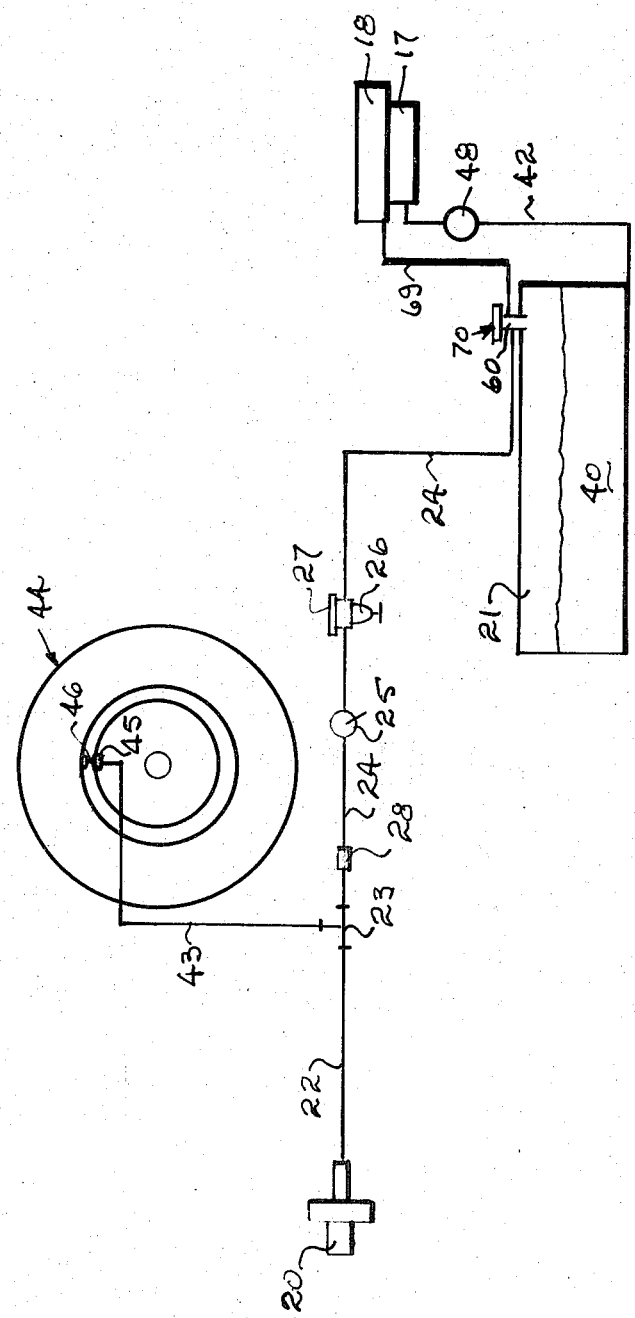
FIG. 2 is a schematic diagram of the invention shown in FIG. 1.

Normally the fuel vapors are ducted to the engine 14 by way of the vapor exhaust conduit or tube 69. The tube 69, FIGS. 1 and 2, is connected to an exhaust port defined by an horizontal, laterally extending tube segment 91 affixed into the wall 77 defining the chamber 76, FIG. 3.

It will be understood that when there is a positive pressure in the fuel tank 21 of sufficient magnitude to overpower and compress a pressure valve spring 95 and lift up the washer 73, only then will there be fuel vapors ducted to the engine 14 via the conduits 91 and 69. The valve disc 72 will only on rare occasions permit vapor to be ducted to the atmosphere thereat. If desired, the valve disc 72 can be made so stiff that it may never flex or dish as described hereinabove.

The pressure valve spring 95 is an helical compression spring. The pressure valve spring 95 is seated at the lower end thereof on an annular member 96, which in turn is seated on a dished metal washer 97. The washer 97 is dished upwardly and rests on the elastomeric disc 73, but permits the latter to dish upwardly to vent vapors from the fuel tank 21 via the filler spout 60 and the filler spout adaptor 61. The upper end of the pressure spring 95 is biased against the emergency relief pressure valve disc 72. A bell-shaped spring guide 98, the disc 72, and the cap portion 71 are fixed together by a centrally located round headed rivet 99, FIG. 3. When the pressure in the fuel tank 21 is great enough, the pressure spring 95 will be compressed and the assembly of the disc 73, the washer 97, and the member 96 will be lifted together as a unit.

The vacuum valve in the cap means 70 comprises a small helical compression spring 100 with its lower end biased against a small hat-shaped bushing 102. The bushing 102 is carried by the washer 97 and is disposed about a valve stem 103, thus forming a valve guide. The upper end of the valve stem 103 is provided with an annular valve spring retainer shoulder 104. The spring 100 reacts against the shoulder 104 and biases a small dish-shaped vacuum valve 105 shut against a bottom side of the disc 73. Only when the fluid pressure in the chamber 76 exceeds the fluid pressure in the filler spout 60 and the filler spout adaptor 61 and thus creating a pressure differential or vacuum in the spout 60 and the adaptor 61, will the vacuum valve 105 be biased downwardly for releasing pressure from the chamber 76 into the filler spout 60, the filler spout adaptor 61, and the fuel tank 21. The pressure fluid flows along the vacuum valve stem 103 through the bushing 102 and peripherally of the vacuum valve 103 into the filler spout adaptor 61 and the filler spout 60 and thence to the gas tank 21.

It must not be forgotten, FIG. 3, that the spare tire and wheel assembly means 44 may be needed to serve its primary function as one of the running wheels of the vehicle 10 in an emergency. Whereupon, there being no other spare tire and wheel assembly means 44 available, the cap 45 at the end of the air line 43 must be disconnected from the tire valve stem 46, FIGS. 1 and 2. The use of a conventional end plug, not shown, threaded into the cap 45 will prevent the escape of compressed air from the line 43 and keep the compressor 20 from being unnecessarily overloaded. It is understood that the compressor 20 is provided with pressure sensitive control means that shuts off the compressor 20 when the pressure in the discharge line 22 reaches a predetermined maximum pressure.

Referring again to FIG. 3, the filler cap spout adaptor 61 has a cylindrical wall 110 adapted to be threaded at its lower end onto the filler spout 60. The adaptor 61 has a radially inwardly extending internal flange 111 for supporting an annular compressible sealing ring 112, for sealing the connection of the adaptor 61 to the filler spout 60. An annular upper end wall 122 is spot welded or riveted to the flange 74 at 75, referred to hereinabove. Preferably, the flange 74 at its inner edge extends downwardly and terminates in a cylindrical wall 113.

Figure 4:
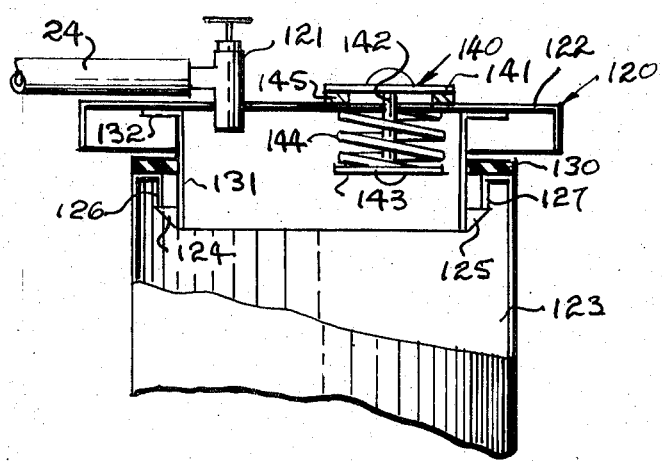
FIG. 4 is a view similar to the view shown in FIG. 3, of a modified gas cap embodying the invention in operational connection with a liquid fuel tank.

An alternative embodiment of the invention, FIG. 4, shows the air supply line 24 connected to a modified gas cap means indicated generally by the reference numeral 120. More particularly, the air supply line 24 is connected to manually adjustable needle valve means 21 affixed to a cupshaped removable filler cap portion 122. The cap portion 122 is connected to a gas tank filler spout 123 in a conventional manner, such as by bayonet slots, not shown, and by camming. For example, diametrically opposed camming flanges 124 and 125 are introduced downwardly into the bayonet slots and the cap portion 122 is turned, preferably clockwise, beneath two downwardly extending camming surfaces 126 and 127, respectively integrally built into the filler spout 123. An annular washer-shaped elastomeric seal 130 carried by a tubular wall portion 131 of the cap portion 122 is provided to seal the connection between the cap portion 122 and the filler spout 123. Preferably the wall portion has a flat upper annular flange 132 fixed as by spot welding to the underside of the cap portion 122.

Pressure relief valve means indicated generally by the reference numeral 140 permits the release of excess pressure in the tank and spout 123. The valve comprises a valve 141 having a stem 142, and a keeper 143 on the valve stem 142 for retaining an helical compression spring 144 in place. The spring 144 is biased against the keeper 142 to keep the valve 141 closed against a valve seat 145 atop the gas cap portion 122. This embodiment of the invention does not include vacuum valve means due to the presence of the compressed air connection to line 24.

It will be understood that this invention can be modified to adapt it to various circumstances and conditions, and it is accordingly desired to comprehend within the purview of this invention such modifications as may be considered to fall within the scope of the appended claims.

What is claimed, is:

1. In a vehicle, engine means, air compressor means, liquid fuel tank means, fuel feed line means connected to said engine means for conducting fuel thereto from said fuel tank means, fuel pump means connected into said fuel feed line means, and spare tire and wheel assembly means functioning as an accumulator and connected to said air compressor means for receiving and storing compressed air therefrom, and said fuel tank means being connected to said air compressor means and said spare tire and wheel assembly means for receiving compressed air therefrom that forces liquid fuel from said fuel tank means to said engine means when said fuel pump means is not in operation.

2. In a vehicle as set forth in claim 1, wherein said engine means drives said air compressor means.

3. In a vehicle, engine means, fuel feed line means, liquid fuel tank means for supplying fuel to said engine means through said fuel feed line means, gas cap means connected to said liquid fuel tank means, means venting fuel vapor from said liquid fuel tank means through said gas cap means back to said engine means for consumption therein, fuel pump means connected to said fuel feed line means, and pressure fluid means connected to said liquid fuel tank means for forcing fuel from said liquid fuel tank means to said engine means.

4. In a vehicle, engine means, air compressor means, liquid fuel tank means, fuel feed line means connected to said engine means for conducting fuel thereto from said liquid fuel tank means, fuel pump means connected to said fuel feed line means, spare tire and wheel assembly means functioning as an accumulator and connected to said air compressor means for receiving and storing compressed air, said liquid fuel tank means being connected to said air compressor means and said spare tire and wheel assembly means for receiving compressed air therefrom that forces liquid fuel from said liquid fuel tank means to said engine means when said fuel pump means is not in operation, gas cap means connected to said liquid fuel tank means, said gas cap means having vacuum valve means for admitting atmospheric air into said liquid fuel tank means for relieving any vacuum therein, and means for venting vapors from said liquid fuel tank means and said gas cap means to the atmosphere.

5. In a vehicle as set forth in claim 4, wherein said gas cap means has pressure valve means therein for relieving pressure in said liquid fuel tank means.

6. In a vehicle as set forth in claim 4, means venting fuel vapor from said liquid fuel tank means through said gas cap means back to said engine means for consumption therein.

7. In a vehicle, engine means, liquid fuel tank means, fuel feed line means, fuel pump means connected to said fuel feed line means for pumping fuel from said liquid fuel tank means to said engine means, gas cap means connected to said liquid fuel tank means, said gas cap means having vacuum valve means therein for relieving any vacuum in said liquid fuel tank means, said gas cap means having pressure valve means therein for relieving the pressure in said liquid fuel tank means, and means venting fuel vapor from said liquid fuel tank means through said gas cap means back to said engine means for consumption therein.

8. In a vehicle as set forth in claim 7, wherein said gas cap means is vented to the atmosphere.

9. In a vehicle, liquid fuel tank means, engine means, gas cap means connected to said liquid fuel tank means, said gas cap means having vacuum valve means therein for relieving any vacuum in said liquid fuel tank means, said gas cap means having pressure valve means therein for relieving vapor pressure in said liquid fuel tank means, and means venting fuel vapor from said liquid fuel tank means through said gas cap means back to said engine means for consumption therein.

10. In a vehicle, engine means, fuel feed line means, liquid fuel tank means connected to said engine means for supplying fuel thereto through said fuel feed line means, fuel pump means connected into said fuel feed line means, gas cap means connected to said fuel tank means, said gas cap means having vacuum valve means for admitting fluid into said fuel tank means for relieving any vacuum therein, and means venting fuel vapor from said fuel tank means through said gas cap means back to said engine means for being consumed by said engine means.

11. In a vehicle as set forth in claim 10, wherein said gas cap means has pressure valve means formed therein for relieving the fluid pressure in said fuel tank means and for venting the fuel vapor from said gas cap means to said engine means, and said gas cap means closes said fuel tank means to the atmosphere.

12. In a vehicle, engine means, fuel feed line means, liquid fuel tank means connected to said engine means for supplying fuel thereto through said fuel feed line means, fuel pump means connected to said fuel feed line means, accumulator means connected to said liquid fuel tank means, said accumulator means having pressure fluid means therein for forcing liquid fuel from said liquid fuel tank means to said engine means through said fuel feed line means, compressor means connected to said accumulator means and said liquid fuel tank means for supplying pressure fluid thereto, and means venting fuel vapor from said liquid fuel tank means back to said engine means for consumption therein.

13. In a vehicle as set forth in claim 12, pressure regulator means controlling the flow of said pressure fluid to said liquid fuel tank means.

14. In a vehicle as set forth in claim 12, valve means controlling the flow of said pressure fluid in said liquid fuel tank means.

* * * * *